(12) United States Patent
Omaru et al.

(10) Patent No.: US 9,287,584 B2
(45) Date of Patent: Mar. 15, 2016

(54) ELECTROLYTE FOR LI STORAGE BATTERY AND LI STORAGE BATTERY

(71) Applicant: JX Nippon Oil & Energy Corporation, Tokyo (JP)

(72) Inventors: Atsuo Omaru, Tokyo (JP); Takeshi Nishizawa, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 14/383,126

(22) PCT Filed: Feb. 26, 2013

(86) PCT No.: PCT/JP2013/054872
§ 371 (c)(1),
(2) Date: Sep. 5, 2014

(87) PCT Pub. No.: WO2013/133079
PCT Pub. Date: Sep. 12, 2013

(65) Prior Publication Data
US 2015/0079482 A1    Mar. 19, 2015

(30) Foreign Application Priority Data
Mar. 6, 2012   (JP) .................................. 2012-049022

(51) Int. Cl.
*H01M 10/0567*   (2010.01)
*H01M 10/0525*   (2010.01)
(Continued)

(52) U.S. Cl.
CPC .......... *H01M 10/0567* (2013.01); *H01M 4/131* (2013.01); *H01M 4/133* (2013.01); *H01M 10/0525* (2013.01); *H01M 10/4235* (2013.01); *H01M 2/1653* (2013.01); *H01M 4/525* (2013.01);
(Continued)

(58) Field of Classification Search
None
See application file for complete search history.

(56) References Cited

U.S. PATENT DOCUMENTS

| 6,033,797 A | 3/2000 | Mao et al. |
| 6,074,777 A | 6/2000 | Reimers et al. |
| 2005/0142448 A1* | 6/2005 | Kim ..................... H01M 6/164 429/326 |

FOREIGN PATENT DOCUMENTS

| CA | 2216898 A1 | 3/1999 |
| EP | 0759641 A1 | 2/1997 |

(Continued)

OTHER PUBLICATIONS

Int'l Search Report issued May 7, 2013 in Int'l Application No. PCT/JP2013/054872.
Extended Search Report issued Sep. 18, 2015 in EP Application No. 13757332.5.

*Primary Examiner* — Sarah A Slifka
(74) *Attorney, Agent, or Firm* — Panitch Schwarze Belisario & Nadel LLP (57) ABSTRACT

The present invention provides an electrolyte for a Li storage battery comprising a compound that can improve safety of a storage battery without causing the degradation in performances thereof and a Li storage battery comprising the electrolyte. The electrolyte comprises at least 1,1-diphenylethane the Li storage battery comprises the electrolyte. Particularly preferably provided are an electrolyte for a Li storage battery comprising 1,1-diphenylethane, a cyclic carbonate (e.g., ethylene carbonate), a chain carbonate (e.g., dimethyl carbonate, diethyl carbonate, ethyl methyl or ethylmethyl carbonate) and a Li salt and a Li storage battery comprising such an electrolyte.

16 Claims, 2 Drawing Sheets (51) Int. Cl.
*H01M 10/42* (2006.01)
*H01M 4/131* (2010.01)
*H01M 4/133* (2010.01)
 H01M 10/0569 (2010.01)
 H01M 4/525 (2010.01)
 H01M 4/587 (2010.01)
 H01M 4/02 (2006.01)
 H01M 2/16 (2006.01)

(52) U.S. Cl.
 CPC ........... *H01M 4/587* (2013.01); *H01M 10/0569* (2013.01); *H01M 2004/027* (2013.01); *H01M 2004/028* (2013.01); *Y02E 60/122* (2013.01)

(56) References Cited

FOREIGN PATENT DOCUMENTS

| EP | 2784868 | A1 | 10/2014 |
| EP | 2797153 | A1 | 10/2014 |
| EP | 2797154 | A1 | 10/2014 |
| JP | H11-162512 | A | 6/1999 |
| JP | 3061756 | B2 | 7/2000 |
| JP | 3061759 | B2 | 7/2000 |
| JP | 2004-063114 | A | 2/2004 |
| JP | 3942134 | B2 | 7/2007 |

\* cited by examiner

ELECTROLYTE FOR LI STORAGE BATTERY AND LI STORAGE BATTERY

CROSS-REFERENCE TO RELATED APPLICATION

This application is a Section 371 of International Application No. PCT/JP2013/054872, filed Feb. 26, 2013, which was published in the Japanese language on Sep. 12, 2013, under International Publication No. WO 2013/133079 A1, and the disclosure of which is incorporated herein by reference.

TECHNICAL FIELD

The present invention relates to an electrolyte for a Li storage battery comprising a compound that can improve safety of the storage battery without causing the degradation in performances thereof and a Li storage battery comprising such an electrolyte.

BACKGROUND ART

It has passed almost 20 years since an issue of global warming was presented, and the necessity of some measures therefor has been widely recognized from international and academic viewpoints. Among various factors of the global warming, greenhouse gas can be artificially reduced. One of the ideas to achieve the greenhouse gas reduction is efficient use of energy. It is conceivable that the energy use efficiency can be enhanced by using energy without waste that is energy saving and by storing the energy that has not been used.

Particularly, in recent years, which are referred to as "electricity-dependent society", products that are driven with electric power have been on the rise in industries ranging from home electronics, electronic device to automobiles, and therefore developments of mechanisms that can be driven with less electric power have been focused. Stand-alone type power generators as typified by solar photovoltaic power generation independent on power networks managed by conventional electric power companies have been experimented in a large scale and some of them have been commercialized. As the results, electricity-dependency is more likely to increase more than ever.

While the aforesaid electric utilization devices are driven, electricity (electric power) is constantly consumed. However, upon halt of driving, the electric power becomes surplus but is currently wasted without being stored. For the above-described efficient energy use should be enhanced not only by using a secondary battery for driving devices when the devices are carried or used in the outdoors but also by storing and using the wasted energy.

In the process of technological development or partial commercialization of environment-friendly electric-powered vehicles and hybrid vehicles or solar photovoltaic power generation or wind force power generation placed as power generation with renewable energy, as concrete measures for prevention of the global warming, the electric power sources for these applications have been required to be large in size and capacity. As such power sources, automobile storage batteries/stationary storage batteries have been demanded, which are excellent in input-output characteristics such that they can absorb rapid output fluctuation caused by boost charge/regeneration upon sudden braking in an automobile and natural phenomena.

As described above, the demand of large scale secondary batteries has been increasing and technologies for ensuring safety for the batteries are important in order to spread them to the society. There are various methods for ensuring safety, among which are known to be accompanied with mechanical operations and to utilize chemical reactions. As one of such methods, it is known that the safety can be ensured by an overcharge protection function obtained using some type of an organic compound mixed with an electrolyte to utilize the electrochemical reactivity thereof even when a control circuit is damaged.

This method is disclosed in Japanese Patent No. 3061756 (Patent Literature 1), Japanese Patent No. 3061759 (Patent Literature 2) and the like. This function provides a protection for a secondary battery against overcharge, wherein the compound electrochemically oxidized when exposed to a high potential and undergoes to collapse of its structure, involved with behaviors such as increase in molecular weight (polymerized) or lowered in molecular weight (gasified), during which the pressure-sensing overcurrent breaker equipped in the battery secondarily actuates to physically disconnect the terminals thereby shutting the charging current (Patent Literature 2).

The aforesaid function is a nature derived from the structure composed of the elements constituting the compound and thus is affected in reactivity by a slight difference in the structure.

When the compound is mixed with an electrolyte, it must not adversely affect the functions of the electrolyte and furthermore the characteristics of the secondary battery. However, it is known that the output characteristics or low temperature discharge characteristics of the secondary battery are adversely affected by physical properties such as viscosity and melting point of the compound depending on the type thereof.

That is, it is important for the compound to have a function selectivity that exhibits only a function of protection against overcharge as expected but does not adversely affect the storage battery characteristics. Currently, there are not so many compounds which are really practical in terms of such a function.

Among phenyl-R-phenyl compounds (R is an aliphatic hydrocarbon) described in Japanese Patent No. 3942134 (Patent Literature 3), diphenylmethane, 1,2-diphenylethane and 2,2-diphenylpropane used in the examples are suitable compounds, and 2,2-diphenylpropane is particularly suitable.

However, these compounds must be deemed insufficient in practical characteristics. Specifically, diphenylmethane, 1,2-diphenylethane and 2,2-diphenylpropane have higher melting points and when mixed with an electrolyte, increase the viscosity thereof and are likely to hinder the migration of lithium ions and furthermore have a strong possibility of adversely affecting the output characteristics, low temperature discharge characteristics and the like. As for diphenylmethane, the withstanding voltage measured using a practical electrode ($LiCoO_2$ cathode), the voltage is higher than the normal operation voltage of the secondary battery (4.2 V or lower). However, since the difference is small, the secondary battery in use is likely to be degraded when exposed to an unexpected high voltage upon generation of overvoltage and would be possibly degraded in reliability.

As described above, when diphenylmethane, 1,2-diphenylethane and 2,2-diphenylpropane which are granted for patent as specific compounds represented by a general formula of phenyl-R-phenyl (R is an aliphatic hydrocarbon) are used in a secondary battery, it is difficult to obtain more satisfactory practical characteristics for the battery.

CITATION LIST

Patent Literature

Patent Literature 1: Japanese Patent No. 3061756
Patent Literature 2: Japanese Patent No. 3061759
Patent Literature 3: Japanese Patent No. 3942134

SUMMARY OF INVENTION

Technical Problem

The present invention has an object to provide an electrolyte for a Li storage battery that exhibits a function of protection when a secondary battery is overcharged, unlikely causes a reaction to degrade the secondary battery even when it is overcharged, thus does not degrade the battery reliability as well as provides the battery with output characteristics that are practical in a wide temperature range.

Solution to Problem

As the results of the extensive studies to achieve the object, the present invention was accomplished on the basis of the finding that among the compounds represented by a general formula of phenyl-R-phenyl (R is an aliphatic hydrocarbon), 1,1-diphenylethane that is not specified in the above patent literatures has the highest performances in terms of the secondary battery practical characteristics and also the finding that performances can be further enhanced by defining the contents of the solvent and electrolyte salt that are constituents of the electrolyte in a specific range.

That is, the present invention relates to an electrolyte for a Li storage battery comprising 1,1-diphenylethane.

The present invention also relates to an electrolyte for a Li storage battery comprising 1,1-diphenylethane, a cyclic carbonate, a chain carbonate and a Li salt.

The present invention also relates to a Li storage battery comprising the above-described electrolyte.

Table 1 below sets forth the melting point of each compounds, and 1,1-diphenylethane used in the present invention has a lower melting point than 1,2-diphenylethane and 2,2-diphenylpropan, is unlikely to hinder the migration of lithium ions even though it is mixed with an electrolyte, and furthermore is extremely unlikely to adversely affect the output characteristics, low temperature discharge characteristics and the like.

With regard to the withstanding voltage measured using a practical electrode ($LiCoO_2$ cathode) set forth in Table 2 below, 1,1-diphenylethane used in the present invention exhibits the voltage in a comparable level of 1,2-diphenylethane and 2,2-diphenylpropane and thus is unlikely to cause a reaction that degrade the battery even upon generation of overvoltage when the secondary battery is in use and to degrade the reliability of the battery.

Advantageous Effects of Invention

By being mixed with an electrolyte, 1,1-diphenylethane used in the present invention performs a function of protecting a secondary battery when it is overcharged and does not degrade the reliability thereof because the withstanding voltage is sufficiently higher than the battery driving voltage. In particular, it does not adversely affect the output characteristics due to its lower melting point and can obtain a higher effect of protecting against overcharge because it can be mixed in a large amount. Furthermore, adjusting of the composition of the electrolyte in a specific ratio makes it possible to accomplish a useful electrolyte that has both an output at low temperature and overcharge safety. Therefore, a secondary battery comprising the electrolyte according to present invention can be large in scale and capacity and can provide an automobile storage battery/a stationary storage battery which are excellent in input-output characteristics such that they can absorb rapid output fluctuation caused by boost charge/regeneration upon sudden braking in an automobile and natural phenomena.

DESCRIPTION OF EMBODIMENTS

The present invention will be described in more detail.

First of all, the Li storage battery of the present invention will be described.

Figure 1:
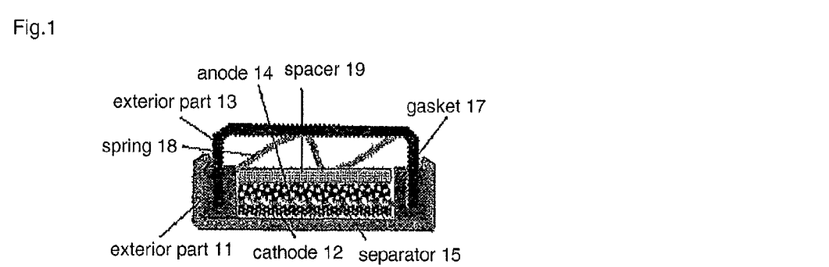
FIG. 1 shows an illustrative drawing of an examples of the sectional view of a secondary battery according to one embodiment of the present invention.

FIG. 1 shows an example of the cross-sectional structure of the secondary battery according to the present invention. This secondary battery comprises a disc-shaped cathode 12 accommodated in a metallic exterior part 11 and a disc-shaped anode 14 accommodated in a metallic exterior part 13, laminated to each other via a separator 15. A metal spring 18 and a spacer 19 are disposed between the exterior part 13 and the anode 14. The interior defined by the exterior parts 11, 13 is filled with a liquid electrolyte, and the periphery of the exterior parts 11, 13 is sealed by clumping a seal gasket 17.

The electrolyte for a Li storage battery according to the present invention will now be described.

The electrolyte comprises a solute dissolved in an organic solvent and these are generally main components.

The electrolyte of the present invention is characterized by containing 1,1-diphenylethane. Inclusion of 1,1-diphenylethane in the electrolyte can provide a secondary battery that exhibits a function of protection when the secondary battery is overcharged and is unlikely to produce a reaction that degrades the battery even upon generation of overvoltage while in use and thus to be degraded in reliability.

The composition of the electrolyte should be determined, taking into consideration of the sum of the physical actions of the organic solvent involved in the migration of Li ions and the abundance or requisite amount of Li ions.

1,1-diphenylethane used in the present invention can be suitably used in the form of a mixture with an electrolyte.

For the purpose of protection against overcharge, it can be expected to enhance the safety sufficiently if compounds such as 1,1-diphenylethane can be presented in a sufficient amount in an electrolyte. However, the basic functions of the electrolyte would be hindered due to the poor solubility of the Li salt.

Therefore, when 1,1-diphenylethane is mixed with an electrolyte, the amount should be limited to an extent that does not hinder the basic functions of the electrolyte.

The content of 1,1-diphenylethane in the electrolyte is preferably from 3 to 35 percent by mass, more preferably from 5 to 30 percent by mass, most preferably from 7 to 25 percent by mass.

One of the components of the electrolyte is a solute generating ions, i.e., a Li salt.

No particular limitation is imposed on the type of solute if it is known to be used for a secondary battery and thus any solute can be used. Specific examples are as follows.

Examples include inorganic salts such as $LiPF_6$ and $LiBF_4$, fluorine-containing organic Li salts such as $LiCF_3SO_3$, $LiN(CF_3SO_2)_2$, $LiN(C_2F_5SO_2)_2$, Li cyclic 1,2-perfluoro ethanedisulfonylimide, Li cyclic 1,3-perfluoro propanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$ and Li bis(oxalate)borate.

Among these compounds, preferred are $LiPF_6$, $LiBF_4$, $LiN(CF_3SO_2)_2$ and $LiN(C_2F_5SO_2)_2$ because they exhibit battery properties and particularly preferred are $LiPF_6$ and $LiBF_4$. These Li salts may be used alone or in combination.

The content of the Li salt in the electrolyte is associated with the content of 1,1-diphenylethane.

That is, the molecule of 1,1-diphenylethane is larger than those of carbonic acid esters used as the electrolyte solvent and thus would hinder the migration of Li ions depending on the content of 1,1-diphenylethane. Therefore, it is necessary to optimize the content of each component in order to obtain an electrolyte with high practicability. The content of the Li salt in the electrolyte varies depending on the type or mixed composition of the solvent dissolving the Li salt but is preferably from 7 to 35 percent by mass, more preferably from 10 to 30 percent by mass, more preferably 13 to 25 percent by mass.

Next, the organic solvent used for the electrolyte will be described.

No particular limitation is imposed on the type of the solvent, which may be arbitrarily selected from conventional solvents. Examples of such solvents include cyclic carbonates, chain carbonates, cyclic ethers, chain ethers, cyclic carboxylic acid esters, chain carboxylic acid esters, phosphorus-containing organic solvents, which have no unsaturated bond.

Other than the viscosity of the Li salt, examples of factors affecting the migration of Li ions include the viscosity and solvating ability of the organic solvent. The solvating ability is a power to dissociate the dissolved ions and thus the optimum value thereof exists because a too strong solvating ability hinders the migration of ions.

A practicable secondary battery is used an wide environmental conditions and thus it is particularly necessary to keep the physical characteristics such as the melting point or boiling point of the organic solvent in a certain definite range.

Realistic solutions for the above-described factors is to use a mixture of plurality of organic solvents, and thus the mixed composition is determined, taking into consideration of practical characteristics from combinations of physical properties such as higher and lower melting points or higher and lower solvating abilities.

The electrolyte used in the present invention is preferably a mixture of a cyclic carbonate and a chain carbonate, having no carbon-carbon unsaturated bond.

Examples of the cyclic carbonates include alkylene carbonates having an alkylene group having 2 to 4 carbon atoms such as ethylene carbonate, propylene carbonate and butylene carbonate. With the objective of improving the battery characteristics, preferred are ethylene carbonate and propylene carbonate, and particularly preferred is ethylene carbonate.

The chain carbonates are preferably dialkyl carbonates, and the carbon number of the alkyl group constituting the chain carbonates is preferably from 1 to 5, particularly preferably from 1 to 4. Specific examples include dialkyl carbonates, which may be symmetric chain alkyl carbonates such as dimethyl carbonate, diethyl carbonate and di-n-propyl carbonate and asymmetric chain alkyl carbonates such as ethylmethyl carbonate, methyl-n-propyl carbonate and ethyl-n-propyl carbonate. Among these compounds, dimethyl carbonate is preferable because of its viscosity which is lowest.

However, since dimethyl carbonate has a rather low boiling point, it can provide more suitable characteristics when mixed with chain carbonates which exhibit a higher boiling point. Suitably mixed is diethyl carbonate but other chain carbonates can be used without any problem.

The mixed ratio varies also depending on the desired practical characteristics. The ratio of the chain carbonate to the cyclic carbonate exists in the form of the optimum composition also including the Li salt ratio.

The content of the cyclic carbonate in the electrolyte is preferably from 1 to 35 percent by mass, more preferably from 3 to 30 percent by mass, more preferably from 4 to 25 percent by mass. A plurality of cyclic carbonates may be mixed.

Whilst, the content of the chain carbonate in the electrolyte is preferably from 40 to 70 percent by mass, more preferably 43 to 68 percent by mass. A plurality of chain carbonates may be mixed.

The following combinations are suitable as the overall composition.

Among the combinations of ethylene carbonate and dialkyl carbonates, preferred is the combination of ethylene carbonate and dimethyl carbonate, which may further contain symmetric chain dialkyl carbonates and/or asymmetric chain dialkyl carbonates. For example, preferred is an solvent comprising ethylene carbonate, symmetric chain dialkyl carbonates and asymmetric chain dialkyl carbonates such as the combination of ethylene carbonate, dimethyl carbonate and diethyl carbonate, the combination of ethylene carbonate, dimethyl carbonate and ethylmethyl carbonate, and the combination of ethylene carbonate, dimethyl carbonate, diethyl carbonate and ethylmethyl carbonate because they have a good balance of cycle characteristics and high output discharge characteristics. In particular, asymmetric chain dialkyl carbonates are preferably ethylmethyl carbonate and the alkyl group of the alkyl carbonate has preferably 1 or 2 carbon atoms.

Furthermore, cyclic ethers, chain ethers, cyclic carboxylic acid esters or chain carboxylic acid esters as solvents assisting the dissociation or migration of ions may be added to the above-described main organic solvents.

Examples of the cyclic ethers include tetrahydrofuran and 2-methyltetrahydrofuran while examples of the chain ethers include dimethoxyethane and dimethoxymethane.

Examples of the cyclic carboxylic acid esters include γ-butyrolactone and γ-valerolactone while examples of the chain carboxylic acid esters include methyl acetate, methyl propionate, ethyl propionate and methyl butyrate.

Among these compounds, chain carboxylic acid esters are suitable.

Furthermore, a fluorine-containing cyclic carbonate having 2 or more fluorine atoms is suitably added to the electrolyte of the present invention.

No particular limitation is imposed on the number of fluorine atom of the fluorine-containing cyclic carbonate having 2 or more fluorine atoms. However, for a fluorinated ethylene carbonate, the lower limit of the fluorine atom number is usually 2 or more and the upper limit is usually 4 or fewer, preferably 3 or fewer.

For a fluorinated propylene carbonate, the lower limit is usually 2 or more and the upper limit is usually 6 or fewer, preferably 5 or fewer. In particular, those having 2 or more fluorine atoms bonding to carbons forming the cyclic structure are preferable with the objective of improving cycle characteristic and storage characteristics.

Specific examples of the fluorine-containing cyclic carbonate having 2 or more fluorine atoms include fluorinated ethylene carbonates such as cis-4,5-difluoro-1,3-dioxolan-2-on, trans-4,5-difluoro-1,3-dioxolan-2-on, 4,4-difluoro-dioxolan-2-on, trifluoro-1,3-dioxolan-2-on and tetrafluoro-1,3-dioxolan-2-on and fluorinated propylene carbonates such as 4,5-difluoro-4-methyl-1,3-dioxolan-2-on, 4,4-difluoro-4-methyl-1,3-dioxolan-2-on, 4,4,5-trifluoro-5-methyl-1,3-dioxolan-2-on and 4,5-difluoro-4-trifluoromethyl-1,3-dioxolan-2-on. Among these carbonates, fluorinated ethylene carbonates having 2 or more fluorine atoms are preferable with the objective of improving battery characteristics, among which cis-4,5-difluoro-1,3-dioxolan-2-on, trans-4,5-difluoro-1,3-dioxolan-2-on and 4,4-difluoro-dioxolan-2-on are particularly preferable.

The fluorine-containing cyclic carbonate having 2 or more fluorine atoms may be used alone or in combination. No particular limitation is imposed on the content of the fluorine-containing cyclic carbonate compound having 2 or more fluorine atoms in a non-water based electrolyte solution in order to achieve the advantageous effects of the present invention, which is, however, usually 0.001 percent by mass or more, preferably 0.01 percent by mass or more, more preferably 0.1 percent by mass or more, particularly preferably 0.2 percent by mass or more, most preferably 0.25 percent by mass or more. If the content is lower than these ranges, the advantageous effects of the present invention are unlikely to be exhibited. If the content is too large, the internal pressure of the battery when stored at a high temperature may be increased. Therefore, the upper limit is usually 10 percent by mass or less, preferably 4 percent by mass or less, more preferably 2 percent by mass or less, particularly preferably 1 percent by mass or less, most preferably 0.5 percent by mass or less.

Furthermore, cyclic carbonates having an unsaturated bond or an aromatic compound with a total carbon number of 7 or more and 18 or fewer may be added to the electrolyte.

Examples of the cyclic carbonates having an unsaturated bond include vinylene carbonate compounds such as vinylene carbonate, methylvinylene carbonate, ethylvinylene carbonate, 4,5-dimethylvinylene carbonate, 4,5-diethylvinylene carbonate and fluorovinylene carbonate, vinylethylene carbonate compounds such as vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, 4,5-divinylethylene carbonate and methyleneethylene carbonate compounds such as 4,4-dimethyl-5-methyleneethylene carbonate and 4,4-diethyl-5-methyleneethylene carbonate.

Among these compounds, preferred are vinylene carbonate, vinylethylene carbonate, 4-methyl-4-vinylethylene carbonate and 4,5-divinylethylene carbonate, among which more preferred are vinylene carbonate and vinylethylene carbonate with the objective of improving the cycle characteristic. These compounds may be used alone or in combination.

Examples of the aromatic compounds having 7 or more carbon atoms and 18 or fewer carbon atoms in total include biphenyl, alkylbiphenyls such as 2-methylbiphenyl, aromatic compound such as terphenyl, partial hydrogenated substance of terphenyl, cyclopentylbenzene, cyclohexylbenzene, t-butylbenzene, t-amylbenzene, diphenylether and dibenzofuran, partial fluorinated products of the aforesaid aromatic compounds such as 2-fluorobiphenyl, 3-fluorobiphenyl, 4-fluorobiphenyl, o-cyclohexylfluorobenzene and p-cyclohexylfluorobenzene, and fluorine-containing anisole compounds such as 2,4-difluoroanisole, 2,5-difluoroanisole, 2,6-difluoroanisole and 3,5-difluoroanisole.

Among these compounds, preferred are aromatic compounds such as biphenyl, alkylbiphenyls, terphenyl, partial hydrogenated substance of terphenyl, cyclohexylbenzene, t-butylbenzene, t-amylbenzene, diphenylether, and dibenzofuran.

It is assumed that the battery can be suppressed from being significantly degraded in discharge characteristics after storage at a high temperature by suppressing a side reaction between the aromatic compound having 7 or more carbon atoms and 18 or fewer carbon atoms in total and the anode and cathode.

The content of the aromatic compounds having 7 or more carbon atoms and 18 or fewer carbon atoms in total in the electrolyte is usually 0.001 percent by mass or more, preferably 0.1 percent by mass or more, particularly preferably 0.3 percent by mass or more, most preferably 0.5 percent by mass or more so that the electrolyte of the invention exhibits the advantageous effects of the present invention. The upper limit is usually 5 percent by mass or less, preferably 3 percent by mass or less, particularly preferably 2 percent by mass or less. If the content is less than the lower limit, the electrolyte of the present invention may be unlikely to exhibit an effect of improving the safety against overcharge. If the content is too large, the electrolyte would degrade battery characteristics such as storage characteristics at high temperatures.

In an embodiment of the present invention, the cyclic carbonate, chain carbonate, Li salt and, 1,1-diphenylethane were used, varied in the mix ratio to change the composition of the electrolyte.

The cathode will be described.

The cathode 12 may be produced by coating a slurry which is a mixture of for example, a metal compound based-material, a conductive assisting material assisting electron conductivity, a binder and a solvent over a metal foil body for power collection such as a rolled aluminum foil, heat-drying the slurry to remove the solvent and forming the dried coating into a desired dimension and density.

Metal compound-based material usable for a cathode active material is a material that can release electrons to the external circuit of the battery and at the same time release Li ions to the electrolyte and is varied in the amount of Li ion depending on the chemical composition or crystalline structure of the material. The metal-based compound material is preferably a material that can reversibly let many Li ions in and out.

Examples of such a material include transition metal oxide, complex oxide of lithium and transition metal and transition metal sulfide. The transition metal may be Fe, Co, Ni or Mn. Specific examples include transition metal oxides such as $MnO$, $V_2O_5$, $V_6O_{13}$ and $TiO_2$ and inorganic compounds such as $LiNiO_2$, $LiCoO_2$, $LiMn_2O_4$, $TiS_2$, $FeS$ and $MoS_2$. Materials produced by substituting partially specific elements of these materials with an element so as to improve the characteristics thereof may be used.

Other than the above-described inorganic compounds, organic compound-based cathode materials may also be used. Examples of such materials include polyaniline, polypyrrole, polyacene, disulfide-based compounds, polysulfide-based compounds and N-fluoropyridinium salt. The cathode material may be a mixture of the above-described inorganic compound and organic compound.

The physical properties of the above-described cathode material is determined by requisite items in the battery design and the production process caused by constrained conditions such as the utility format of a secondary battery. When the material is produced, the process is designed to achieve the physical properties. Examples of the physical properties include powder particle diameter and distribution, specific surface area and density.

As an example, the powder particle diameter is arbitrarily selected in view of other constituent features of a secondary battery but in general the average value is preferably from 1 to 30 μm, more preferably from 1 to 10 μm with the objective of improving battery characteristics such as rate characteristics and cycle characteristics.

In an embodiment of the present invention, $LiCoO_2$ with an average particle diameter of 5 μm was used in an amount of 90 percent by mass in the cathode.

The above-described cathode materials have a lower electron conductivity, and thus a conductive assistant material assisting electron conductivity preferably coexists in the cathode. The material is suitably a carbon material or a metallic material, and also other materials with a high electron conductivity may also be used. The amount of the material to be coexisted is limited to the minimum necessary so as to raise the content of the cathode material defining the capacity of a secondary battery to the maximum.

Examples of suitable carbon materials include soot, acetylene black, Ketjen black, lampblack, furnace black, carbon black, graphite, carbon fiber, graphite fiber, nanofibers, nanotube, coke, hard carbon and amorphous carbon. The metallic material is desirously a material which is not electrochemically dissolved by potential to which the material is exposed in the cathode and is suitably aluminum, nickel, titanium, stainless steel or the like.

In an embodiment of the present invention, acetylene black was used as a conductive assistant material in an amount of 5 percent by mass in the cathode.

Most of the above-described cathode materials and conductive assistant materials are in powdery form, and thus a small amount of a binder is preferably used to bind the cathode materials and the conductive assistant materials to each other and fix them on a metal foil body for power collection. The binder is required to be chemically or electrochemically inactive and have slight flexibility and affinity and is preferably a plastic-resin material.

Examples of the plastic-resin material include fluorinated resins such as polyvinyl fluoride, polyvinylidene fluoride and polytetrafluoroethylene, CN group-containing polymers such as polyacrylonitrile and polyvinylidenedicyanide, polyvinyl alcohol-based polymers such as polyvinyl acetate and polyvinyl alcohol, halogen-containing polymers such as polyvinyl chloride and polyvinylidene chloride, conductive polymers such as polyaniline, alkane-based polymers such as polyethylene, polypropylene and poly-1,1-dimethylethylene, unsaturated polymers such as polybutadiene and polyisoprene, polymers having a ring such as polystyrene, polymethylstyrene, polyvinylpyridine and poly-N-vinylpyrrolidone, and acrylic polymers such as polymethylmethacrylate, polyethylmethacrylate, polybutylmethacrylate, polymethyl acrylate, polyethyl acrylate, polyacrylic acid, polymethacrylic acid and polyacrylamide. Alternatively, the plastic-resin material may be a mixture, modified product, derivative, random copolymer, alternate copolymer, graft copolymer or block copolymer of the above resin materials.

The weight-average molecular weight of these resins is usually from 10,000 to 3,000,000, preferably from 100,000 to 1,000,000. If the molecular weight is too low, the coating would be reduced in strength. If the molecular weight is too high, the viscosity increases, making it difficult to form an electrode.

An appropriate slurry solvent may be used, which dissolves only the binder resin but does not other materials so as to distribute sufficiently uniformly the binder or form the slurry into film with a predetermined size. For example, when polyvinylidene fluoride is used, dimethylformamide is suitably used as the solvent. Alternatively, N-methylpyrrolidone may also be used, and the solvent may be arbitrarily selected depending on the production process.

In an embodiment of the present invention, polyvinylidene fluoride was used as the resin in an amount of 5 percent by mass in the cathode.

The metal foil body for power collection is preferably a material that is available inexpensively and can withstand the industrial use and suitably a material that has electrochemical resistance against potential that the cathode generates. For examples, the material is preferably aluminum foil, nickel foil, titanium foil or stainless steel foil. More preferred is rolled aluminum foil that is easily available.

The method for coating the slurry may be a common printing technique. When the coating has a small thickness, gravure printing may be used. When the coating is thick, a printing method such as doctor blade printing or die printing is suitably used.

The coating is then dried by heating, and any drying method may be used. A drying method that can accomplish the desired binding strength with a binder is suitably used.

Thereafter, when the coating is cut into a predetermined size, cutting blade and system therefor that are industrially available are suitably used. In order to obtain a predetermined density, a pressure device and system therefor that can be industrially used are suitably used if necessary.

In an embodiment of the present invention, the coating formation was carried out with a doctor blade method. The drying was carried out in an internal air circulation type oven at a temperature of 110° C. The coating was allowed to pass through a roll-type pressurizer and then punched out into a 15 mm diameter disk-shape thereby producing a cathode 11. The amount of the cathode active material was about 23 mg.

Next, the anode will be described.

The anode 14 may be produced by coating a slurry which is a mixture of for example, a carbonaceous material, a binder and a solvent over a metal foil body for power collection such as a rolled copper foil, heat-drying the slurry to remove the solvent and forming the dried coating into a desired dimension and density.

The carbonaceous material usable for the anode refers to a material that can bind and stabilize the Li ions and the electrons floating out from the external circuit and is preferably a material having many stabilizing sites therein.

For example, the carbonaceous material may be any material originating from organic substances regardless of whether the crystallinity is high or low and is suitably graphite, coke, amorphous carbon, hard carbon or polymer carbon. In terms of principles, Li ions sandwiched between graphene layers bond to electrons and are stabilized.

Alternatively, a method for forming an electrochemically intermetallic compound may be employed as other stabilizing systems, and for such a method, silicon, tin, zinc, bismuth, antimony, cadmium, lead, germanium or the like is suitably used.

In addition, other materials exhibiting a low electrochemical reaction potential and thus managing the anode side of a secondary battery may also be used. Examples of the materials include compounds of metal and oxygen, sulfur, halogen, nitrogen or phosphorus.

Depending on the usage of a secondary battery, a number of the above anode materials mixed at a predetermined ratio may be used in order to obtain any discharge profile.

The physical properties of the anode material is determined by requisite items in the battery design production process caused by constrained conditions such as the utility format of a secondary battery. When the material is produced, the process is designed to achieve the physical properties. Examples of the physical properties include powder particle diameter and distribution, specific surface area and density.

As an example, the powder particle diameter is arbitrarily selected in view of other constituent features of a secondary battery but in general the average value is preferably from 1 to 70 μm, more preferably from 5 to 10 μm with the objective of improving battery characteristics such as rate characteristics and cycle characteristics.

In an embodiment of the present invention, graphite with an average particle diameter of 20 μm was used in an amount of 94 percent by mass in the anode.

Although most of the above-described anode materials are high in electron conductivity, a conductive assistant material assisting electron conductivity preferably coexists in the case of insufficient contact between the particles due to a smooth surface of the anode material. The material is suitably a carbon material or a metallic material, and also other materials with a high electron conductivity may also be used. The amount of the material to be coexisted is limited to the minimum necessary so as to raise the content of the anode material defining the capacity of a secondary battery to the maximum.

The above-described carbonaceous material is suitably soot, acetylene black, Ketjen black, lampblack, furnace black, carbon black, graphite, carbon fiber, graphite fiber nanofibers, nanotube, coke, hard carbon or amorphous carbon. The metallic material is desirously a material that does not electrochemically react with potential to which it is exposed in the anode and is suitably copper, nickel, titanium or stainless steel.

In an embodiment of the present invention, acetylene black was used as a conductive assistant material in an amount of 1 percent by mass in the anode.

Most of the above-described anode materials and conductive assistant materials are in powdery form, and thus a small amount of a binder is preferably used to bind the anode materials and the conductive assistant materials to each other and fix them on a metal foil body for power collection. The binder is required to be chemically or electrochemically inactive and have slight flexibility and affinity and is preferably a plastic-resin material.

Examples of the plastic-resin material include fluorinated resins such as polyvinyl fluoride, polyvinylidene fluoride and polytetrafluoroethylene, CN group-containing polymers such as polyacrylonitrile and polyvinylidenedicyanide, polyvinyl alcohol-based polymers such as polyvinyl acetate and polyvinyl alcohol, halogen-containing polymers such as polyvinyl chloride and polyvinylidene chloride, conductive polymers such as polyaniline, alkane-based polymers such as polyethylene, polypropylene and poly-1,1-dimethylethylene, unsaturated polymers such as polybutadiene and polyisoprene, polymers having a ring such as polystyrene, polymethylstyrene, polyvinylpyridine and poly-N-vinylpyrrolidone, and acrylic polymers such as polymethylmethacrylate, polyethylmethacrylate, polybutylmethacrylate, polymethyl acrylate, polyethyl acrylate, polyacrylic acid, polymethacrylic acid and polyacrylamide. Alternatively, the plastic-resin material may be a mixture, modified product, derivative, random copolymer, alternate copolymer, graft copolymer or block copolymer of the above resin materials. The weight-average molecular weight of these resins is usually from 10,000 to 3,000,000, preferably from 100,000 to 1,000,000. If the molecular weight is too low, the coating would be reduced in strength. If the molecular weight is too high, the viscosity increases, making it difficult to form an electrode.

An appropriate slurry solvent may be used, which dissolves only the binder resin but does not other materials so as to distribute sufficiently uniformly the binder and form the slurry into film with a predetermined size. For example, when polyvinylidene fluoride is used, dimethylformamide is suitably used as the solvent. Alternatively, N-methylpyrrolidone may also be used, and the solvent may be arbitrarily selected depending on the production process.

In an embodiment of the present invention, polyvinylidene fluoride was used as the resin in an amount of 5 percent by mass in the anode.

The metal foil body for power collection is preferably a material that is available inexpensively and can withstand the industrial use and suitably a material that does not exhibit an electrochemical reactivity with potential that the anode generates. For examples, the material is preferably copper foil, nickel foil, titanium foil or stainless steel foil. More preferred are electrolysis copper foil and rolled copper foil that are easily available.

The method for coating of the slurry may be a common printing technique. When the coating has a small thickness, gravure printing may be used. When the coating is thick, a printing method such as doctor blade printing or die printing is suitably used.

The coating is then dried by heating, and any drying method may be used. A drying method that can accomplish the desired binding strength with a binder is suitably used.

Thereafter, when the coating is cut into a predetermined size, cutting blade and system therefor that are industrially available are suitably used. In order to obtain a predetermined density, a pressure device and system therefor that can be industrially used are suitably used if necessary.

In an embodiment of the present invention, the coating formation was carried out with a doctor blade method. The drying was carried out in an internal air circulation type oven at a temperature of 110° C. The coating was allowed to pass through a roll-type pressurizer and then punched out into a 15 mm diameter disk-shape thereby producing an anode 14. The amount of the anode active material was about 14 mg.

The separator 15 separates the cathode 12 from the anode 14 to prevent short-circuit of current caused by contact between the cathode and anode and allows the lithium ions to pass through. The separator is suitably a porous film of resin.

The film is suitably a stretched film produced by stretching a bulk resin to be opened or a nonwoven fabric produced by multi-laminating fibrous resin fibers so as to be formed into a hole structure like a porous film.

Examples of the materials of the resin include polyolefins, among which polyethylene is particularly suitable. Polyethylene has a relatively lower melting point and thus when the temperature of a battery is raised for some reasons (e.g., becomes unstable due to short-circuiting), the pores of the polyethylene film are closed by thermal melting so as to prevent the migration of driving ions thereby terminating the reaction and ensuring the safety.

A stretch type microporous film is usually formed by adding a plasticizer to polyolefin and remove the plasticizer before and after stretching thereby forming a relatively uniform microporous structure originating sites where the plasticizer have been presented.

Stretching is usually carried out in both the longitudinal and transverse directions suitably together with the aforesaid plasticizer removal in combination with any of the atmosphere medium, temperature, speed, stress and repeating number of process thereby providing a suitable stretched film.

A high quality stretched film can be produced through the above-described process. However, since the process is a multi-stage process and thus makes it difficult to reduce the production cost incurred by these stages, it would a negative factor for spread of secondary batteries.

Whilst, the process can be simplified by stretching the resin only in the longitudinal direction without using a plasticizer thereby producing a porous film that can be used at an industrial level with a reduced production cost. In this case, the resin is polyolefin, and polypropylene is suitably used.

In an embodiment of the present invention, a microporous film was used produced by stretching biaxially polyethylene used as the resin in the transverse and longitudinal directions. The film had a film thickness of 25 μm, a porosity of 45% and a melting point of about 120° C.

A secondary battery having a structure as described above operates as follows.

When the battery is charged, Li ions contained in the cathode 12 pass through the separator 15 and then are inserted between the layers of the layered graphite contained in the anode 14. When the battery is discharged, the Li ions are deinserted from the layered graphite contained in the anode 14 and return to the cathode 12 via the separator 15.

The secondary battery according to the present invention has been described above but is not limited to the above-described embodiments and various modifications are available within the scope that does not deviate the gist of the invention.

In the above embodiments, a coin type secondary battery has been described, but the secondary battery of the present invention is similarly applicable to those having other shapes such as button type, paper type, prismatic type, and cylindrical type with a spiral structure. The secondary battery of the present invention can be made in various sizes such as thin, large and the like.

Furthermore, the present invention is illustrated with embodiments envisaging that the electrolyte of the present invention is used for a secondary battery produced by a usual method where the electrode or separator is impregnated with liquid. However, the present invention can be applied to any other electrolytes and for example can be suitably used for gel-like electrolyte and solid electrolyte.

EXAMPLES

The present invention will be described in more detail with the following Examples and Comparative Examples but is not limited thereto.

Example 1

Secondary batteries were produced using electrolytes each having a composition set forth in Table 3 in accordance with the embodiment of the present invention.

The resulting secondary batteries were charged with a constant electric current of 0.875 mA to 4.2 V and then charged at a constant voltage for 8 hours. Thereafter, the secondary batteries were discharged at a constant electric current of 0.875 mA to 3.0 V at room temperature. Furthermore, after the secondary batteries were charged again under the same conditions as the above and left in an oven kept at 0° C. for 2 hours, the batteries were discharged at a constant electric current of 7.00 mA. The ratio of the second discharge capacity to the first discharge capacity was calculated and defined as a capacity retention ratio derived from the 2C discharge test at 0° C. The results were set forth in Table 3 and also shown in FIG. 2.

Comparative Example 1

Secondary batteries were produced using electrolytes each having a composition set forth in Table 3 with the same procedures of Example 1 and the capacity retention ratio in the 2C discharge test at 0° C. was calculated. The results were set forth in Table 3 and also shown in FIG. 2.

Figure 2:
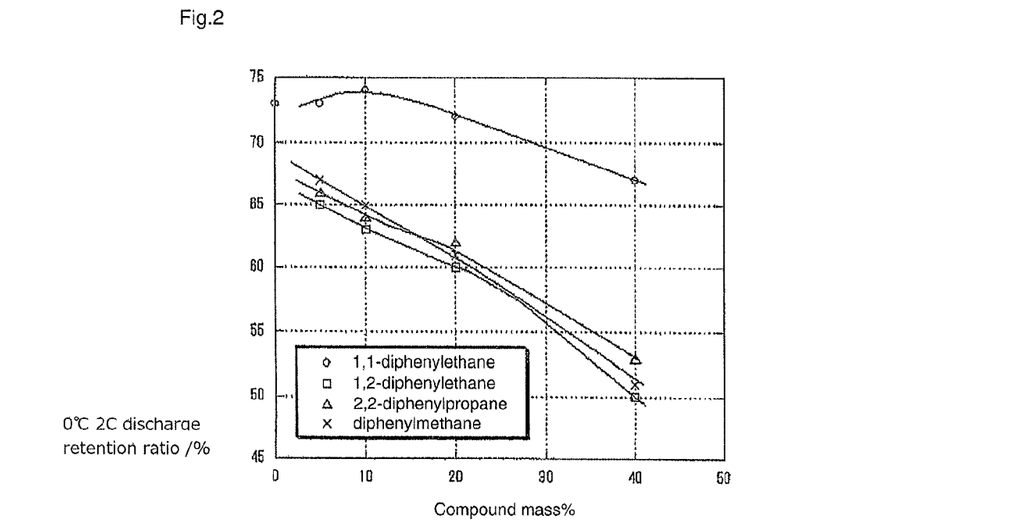
FIG. 2 is a graph showing the relationship of the content of each compound and 2C discharge retention ratio at 0° C. in Experimental Example 1.

Although the experiment was carried out with different types and amounts of compounds, 1,1-diphenylethane exhibited excellent characteristics for a practical low temperature high output discharge even when the amount thereof is increased as shown in FIG. 2.

Example 2

A secondary battery was produced with the same procedures of Example 1 except that an electrolyte having a composition set forth in Table 4 was used and a microporous film produced by uniaxially stretching polypropylene was used as a separator.

In the same manner as Example 1, the capacity retention ratio in the 2C discharge test at 0° C. was calculated. The result was set forth in Table 4.

Comparative Example 2

A secondary battery was produced using an electrolyte having a composition set forth in Table 4 with the same procedures of Example 2 and the capacity retention ratio in the 2C discharge test at 0° C. was calculated. The result was set forth in Table 4.

The use of the electrolyte wherein 1,1-diphenylethane was mixed in combination with the polypropylene separator provided more improved characteristics than the electrolyte containing 2,2-diphenylpropane.

Example 3

Secondary batteries were produced using electrolytes each having a composition set forth in Table 5 with the same procedures of Example 1.

In the same manner as Example 1, the capacity retention ratio in the 2C discharge test at 0° C. was calculated. The results were set forth in Table 5 and also shown in FIG. 3.

Comparative Example 3

Secondary batteries were produced using electrolytes each having a composition set forth in Table 5 with the same procedures of Example 3 and the capacity retention ratio in the 2C discharge test at 0° C. was calculated. The results were set forth in Table 5 and also shown in FIG. 3.

Figure 3:
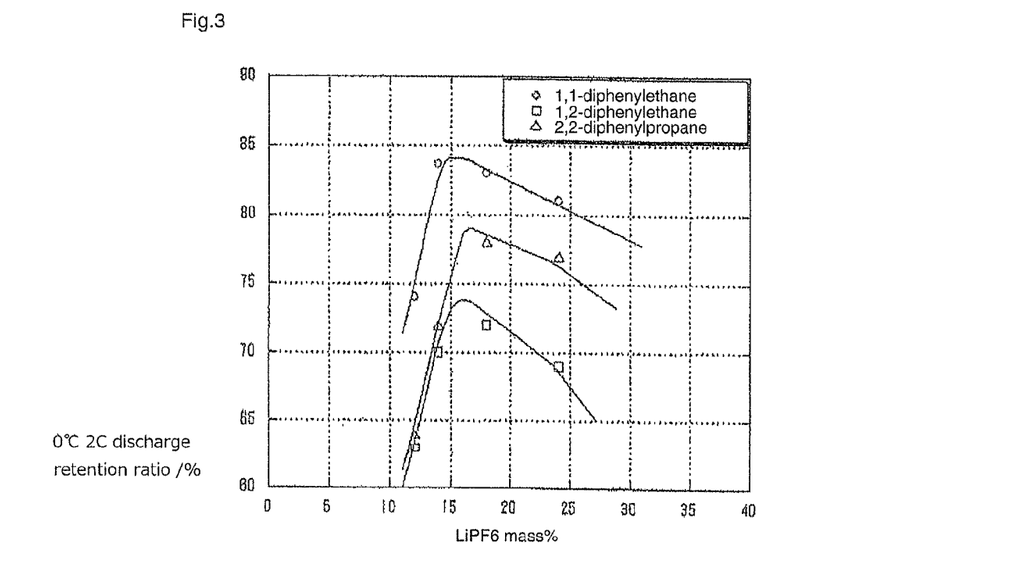
FIG. 3 is a graph showing the relationship of the content of an Li salt in each compound and 2C discharge retention ratio at 0° C. in Experimental Example 3.

From the results of this example, Example 1-2, Comparative Example 1-5, Comparative Example 1-6, the characteristics were improved at a specific Li salt concentration and this was significant particularly when 1,1-diphenylethane was used as shown in FIG. 3.

Example 4

Secondary batteries were produced using electrolytes each having a composition set forth in Table 6 with the same procedures of Example 1.

In the same manner as Example 1, the capacity retention ratio in the 2C discharge test at 0° C. was calculated. The results were set forth in Table 6 and also shown in FIG. 4.

Comparative Example 4

Secondary batteries were produced using electrolytes each having a composition set forth in Table 6 with the same procedures of Example 4 and the capacity retention ratio in the 2C discharge test at 0° C. was calculated. The result was set forth in Table 6 and also shown in FIG. 4.

Figure 4:
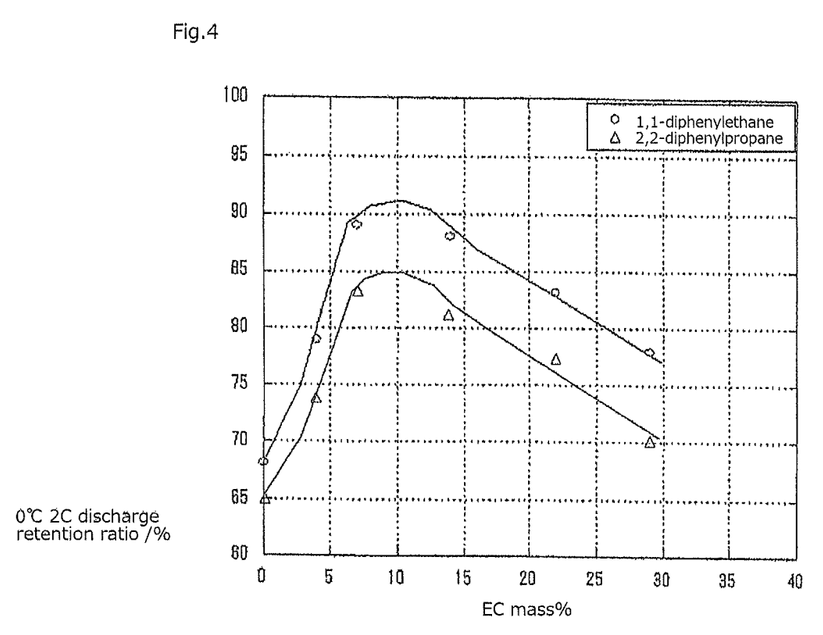
FIG. 4 is a graph showing the relationship of the content of ethylene carbonate with respect to 1,1-diphenylethane and 2C discharge retention ratio at 0° C. in Experimental Example 4.

From the results of this example, Example 3-2 and Comparative Example 3-4, it is apparent that excellent characteristics were obtained within a specific cyclic carbonate concentration range and in particular excellent characteristics were obtained with 1,1-diphenylethane as shown in FIG. 4.

Example 5

Secondary batteries were produced using electrolytes each having a composition set forth in Table 7 with the same procedures of Example 1.

In the same manner as Example 1, the capacity retention ratio in the 2C discharge test at 0° C. was calculated. The results were set forth in Table 7.

From the results of this example and Example 3-2, it becomes apparent that excellent characteristics were obtained with a specific chain carbonate.

TABLE 1

|  | 1,1-diphenylethane | 1,2-diphenylethane | 2,2-diphenylpropane | diphenylmethane |
|---|---|---|---|---|
| Melting point (° C.) | −18 | 52 | 27 | 25 |

TABLE 2

|  | 1,1-diphenylethane | 1,2-diphenylethane | 2,2-diphenylpropane | diphenylmethane |
|---|---|---|---|---|
| Withstanding voltage (V) | 4.60 | 4.62 | 4.70 | 4.36 |

TABLE 3

|  |  | Electrolyte Composition (weight %) | | | | 2 C discharge test at 0° C. |
|---|---|---|---|---|---|---|
|  | Compound | ethylene carbonate | dimethyl carbonate | LiPF$_6$ | Compound | Retention ratio/% |
| Example 1-1 | 1,1-diphenyethane | 25 | 58 | 12 | 5 | 73 |
| Example 1-2 | 1,1-diphenyethane | 23 | 55 | 12 | 10 | 74 |
| Example 1-3 | 1,1-diphenyethane | 20 | 48 | 12 | 20 | 72 |
| Example 1-4 | 1,1-diphenyethane | 14 | 34 | 12 | 40 | 67 |
| Comparative Example 1-1 | none | 26 | 62 | 12 | 0 | 73 |
| Comparative Example 1-2 | 1,2-diphenylethane | 25 | 58 | 12 | 5 | 65 |
| Comparative Example 1-3 | 2,2-diphenylpropane | 25 | 58 | 12 | 5 | 66 |
| Comparative Example 1-4 | diphenymethane | 25 | 58 | 12 | 5 | 67 |
| Comparative Example 1-5 | 1,2-diphenylethane | 23 | 55 | 12 | 10 | 63 |
| Comparative Example 1-6 | 2,2-diphenylpropane | 23 | 55 | 12 | 10 | 64 |
| Comparative Example 1-7 | diphenylmethane | 23 | 55 | 12 | 10 | 65 |
| Comparative Example 1-8 | 1,2-diphenylethane | 20 | 48 | 12 | 20 | 60 |
| Comparative Example 1-9 | 2,2-diphenylpropane | 20 | 48 | 12 | 20 | 62 |
| Comparative Example 1-10 | diphenylmethane | 20 | 48 | 12 | 20 | 61 |
| Comparative Example 1-11 | 1,2-diphenylethane | 14 | 34 | 12 | 40 | 50 |
| Comparative Example 1-12 | 2,2-diphenylpropane | 14 | 34 | 12 | 40 | 53 |
| Comparative Example 1-13 | diphenylmethane | 14 | 34 | 12 | 40 | 51 |

TABLE 4

| | Compound | Electrolyte | Separator | 2 C discharge test at 0° C. Retention ratio/% |
|---|---|---|---|---|
| Example 2 | 1,1-diphenylethane | same as Example 1-2 | micorporous polypropylene film | 71 |
| Comparative Example 2 | 2,2-diphenylpropane | same as Comparative Example 1-6 | micorporous polypropylene film | 62 |

TABLE 5

| | | Electrolyte Composition (weight %) | | | | 2 C discharge test at 0° C. |
|---|---|---|---|---|---|---|
| | Compound | ethylene carbonate | dimethyl carbonate | LiPF$_6$ | Compound | Retention ratio/% |
| Example 3-1 | 1,1-diphenylethane | 23 | 53 | 14 | 10 | 84 |
| Example 3-2 | 1,1-diphenylethane | 22 | 50 | 18 | 10 | 83 |
| Example 3-3 | 1,1-diphenylethane | 20 | 46 | 24 | 10 | 81 |
| Comaprative Example 3-1 | 1,2-diphenylethane | 23 | 53 | 14 | 10 | 70 |
| Comaprative Example 3-2 | 2,2-diphenylpropane | 23 | 53 | 14 | 10 | 72 |
| Comaprative Example 3-3 | 1,2-diphenylethane | 22 | 50 | 18 | 10 | 72 |
| Comaprative Example 3-4 | 2,2-diphenylpropane | 22 | 50 | 18 | 10 | 78 |
| Comaprative Example 3-5 | 1,2-diphenylethane | 20 | 46 | 24 | 10 | 69 |
| Comaprative Example 3-6 | 2,2-diphenylpropane | 20 | 46 | 24 | 10 | 77 |

TABLE 6

| | | Electrolyte Composition (weight %) | | | | 2 C discharge test at 0° C. |
|---|---|---|---|---|---|---|
| | Compound | ethylene carbonate | dimethyl carbonate | LiPF$_6$ | Compound | Retention ratio/% |
| Example 4-1 | 1,1-diphenylethane | 0 | 72 | 18 | 10 | 68 |
| Example 4-2 | 1,1-diphenylethane | 4 | 68 | 18 | 10 | 79 |
| Example 4-3 | 1,1-diphenylethane | 7 | 65 | 18 | 10 | 89 |
| Example 4-4 | 1,1-diphenylethane | 14 | 58 | 18 | 10 | 88 |
| Example 4-5 | 1,1-diphenylethane | 29 | 43 | 18 | 10 | 78 |
| Comparative Example 4-1 | 2,2-diphenylpropane | 0 | 72 | 18 | 10 | 65 |
| Comparative Example 4-2 | 2,2-diphenylpropane | 4 | 68 | 18 | 10 | 74 |
| Comparative Example 4-3 | 2,2-diphenylpropane | 7 | 65 | 18 | 10 | 83 |
| Comparative Example 4-4 | 2,2-diphenylpropane | 14 | 58 | 18 | 10 | 81 |
| Comparative Example 4-5 | 2,2-diphenylpropane | 29 | 43 | 18 | 10 | 70 |

TABLE 7

| | Electrolyte Composition (weight %) | | | | 2 C discharge test at 0° C. |
|---|---|---|---|---|---|
| | ethylene carbonate | chain carbonate (name) | LiPF$_6$ | 1,1-diphenyl-ethane | Retention ratio/% |
| Example 5-1 | 22 | 50 (methylethyl carbonate) | 18 | 10 | 72 |
| Example 5-2 | 22 | 50 (diethyl carbonate) | 18 | 10 | 68 |
| Example 5-3 | 22 | 25 (dimethyl carbonate) 25 (diethyl carbonate) | 18 | 10 | 80 |
| Example 5-4 | 22 | 25 (dimethyl carbonate) 25 (methylethyl carbonate) | 18 | 10 | 83 |

The invention claimed is:
1. An electrolyte for a Li storage battery comprising 1,1-diphenylethane.
2. An electrolyte for a Li storage battery comprising 1,1-diphenylethane, a cyclic carbonate, a chain carbonate and a Li salt.

3. The electrolyte for a Li storage battery according to claim 1 wherein the concentration of 1,1-diphenylethane in the electrolyte is from 3 to 35 percent by mass.

4. The electrolyte for a Li storage battery according to claim 2 wherein the concentration of the cyclic carbonate in the electrolyte is from 1 to 35 percent by mass.

5. The electrolyte for a Li storage battery according to claim 2 wherein the concentration of the chain carbonate in the electrolyte is from 40 to 70 percent by mass.

6. The electrolyte for a Li storage battery according to claim 2 wherein the cyclic carbonate is ethylene carbonate.

7. The electrolyte for a Li storage battery according to claim 2 wherein the chain carbonate is any one of dimethyl carbonate, diethyl carbonate and ethylmethyl carbonate.

8. The electrolyte for a Li storage battery according to claim 2 wherein the Li salt concentration is from 7 to 35 percent by mass.

9. A Li storage battery comprising the electrolyte according to claim 1.

10. The Li storage battery according to claim 9 further comprising a separator comprising polypropylene.

11. The Li storage battery according to claim 9 comprising an anode active material where lithium can be inserted or an anode active material capable of reacting with lithium.

12. The Li storage battery according to claim 9 comprising a carbonaceous anode material.

13. The Li storage battery according to claim 9 wherein the anode comprises graphite.

14. The Li storage battery according to claim 9 wherein the cathode comprises lithium and transition metal.

15. The Li storage battery according to claim 9 wherein the cathode comprises a layered oxide containing cobalt.

16. The Li storage battery according to claim 9 having a structure where the cathode or anode is not wound.

* * * * *